United States Patent [19]
Douglass, Jr.

[11] 3,710,964
[45] Jan. 16, 1973

[54] APPARATUS FOR STORING AND FEEDING BULKY MATERIALS

[76] Inventor: Edward T. Douglass, Jr., 2709 5th Ave. South, Birmingham, Ala. 35233

[22] Filed: June 23, 1971

[21] Appl. No.: 155,941

[52] U.S. Cl............214/17 D, 222/226, 259/DIG. 41, 259/DIG. 42
[51] Int. Cl.................................B65g 65/42
[58] Field of Search...214/17 R, 17 D; 222/226, 227, 222/233-235, 409; 259/37, DIG. 41, DIG. 42

[56] References Cited
UNITED STATES PATENTS

| | | | |
|---|---|---|---|
| 2,798,645 | 7/1957 | Keen et al. | 222/226 |
| 3,166,222 | 1/1965 | Schrader | 222/409 X |

*Primary Examiner*—Robert G. Sheridan
*Attorney*—Jennings, Carter & Thompson

[57] ABSTRACT

A storage and feeding bin having a discharge opening at bottom thereof. A vertical shaft depends from top of bin with lower end adjacent and above opening. Upper end of the shaft is supported by resilient support with lower end depending freely. Angularly spaced agitator blades extend radially and vertically from shaft and vibrator carried by shaft within bin to vibrate shaft and blades carried thereby.

4 Claims, 3 Drawing Figures

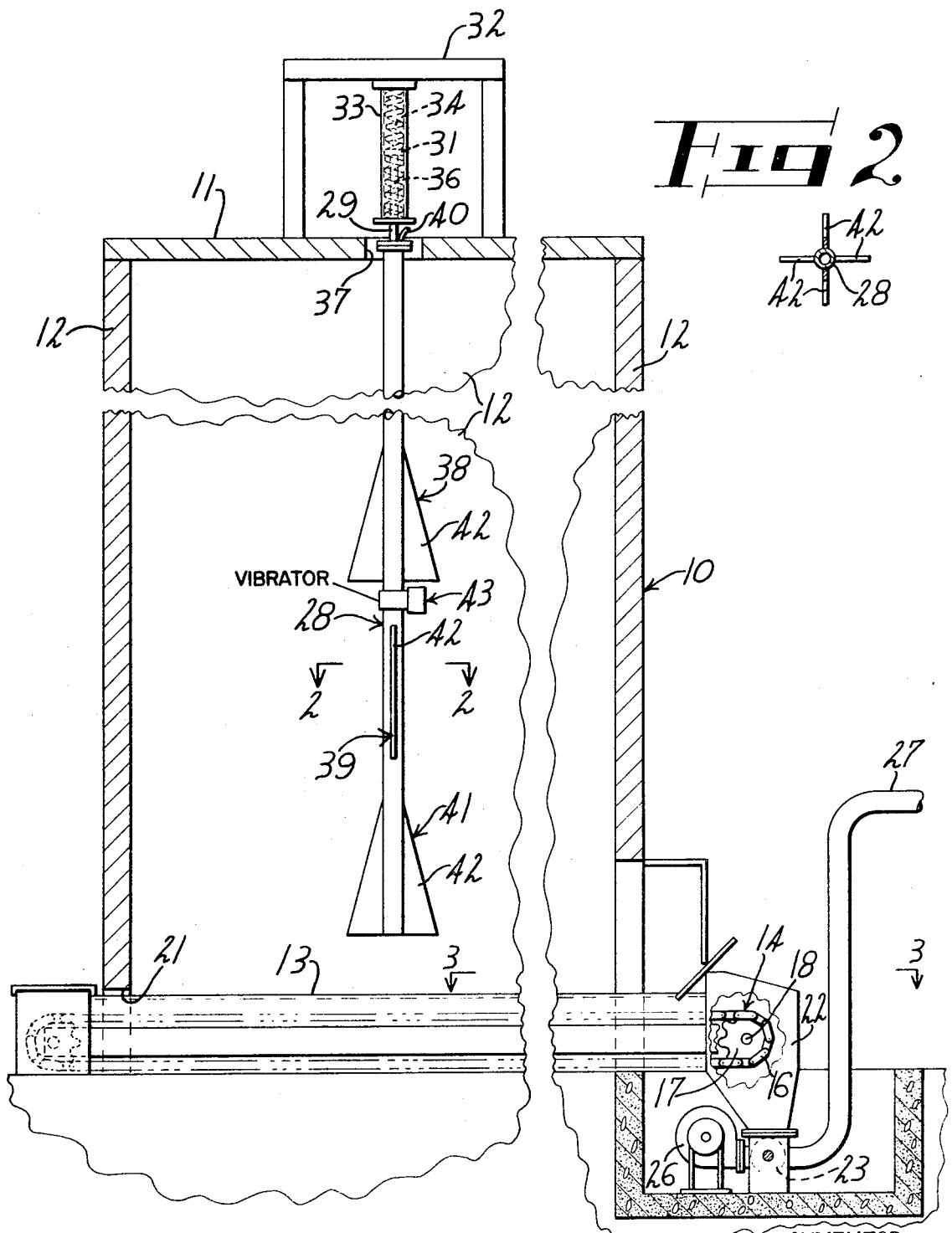

APPARATUS FOR STORING AND FEEDING BULKY MATERIALS

BACKGROUND OF THE INVENTION

This invention relates to apparatus for storing and feeding bulky materials, such as wood chips, wood shavings, sawdust and the like.

Heretofore in the art to which my invention relates, the handling of bulky materials has been very difficult due to the fact that such materials are hygroscopic and have a tendency to swell in the storage bin, thus causing pressure against the side walls which results in arching of the materials over the discharge opening and conveyors or other means for discharging the materials from the bottom of the bin. While a large storage bin may appear to be filled to capacity, there is often a large cavity over the discharge opening which extends throughout the length of the bin. It is not unusual for such cavities to be around 10 feet high, thus resulting in a dangerous condition since it is very difficult to dislodge the materials from the top of the bin by employing probes. This is especially true since the arched materials are vary dense whereby it is difficult to force a probe into or through the arched materials. While the arched materials may be reached easier from the under side, there is great danger of the materials avalanching onto the prober and there are many instances where fatalities have occurred due to attendants being smothered by arched materials dropped on them.

BRIEF SUMMARY OF THE INVENTION

In accordance with my present invention, I eliminate the arching condition by extending a vertical shaft-like member through the top of the storage bin with the lower end of the member terminating adjacent and above the discharge opening. The vertical member is supported by resilient means and carries angularly spaced, flat, agitator blades which extend vertically and radially in position to penetrate bulky materials surrounding the shaft-like member. A vibrator unit is mounted on the vertical shaft-like member inwardly of the storage bin and imparts vibration to the shaft-like member and the agitator blades whereby the blades move relative to the materials, thus maintaining an opening around the shaft-like member and the agitator blade at all times whereby the dense arching condition is not created in the first place. By maintaining a small clearance around the vertical shaft-like member the materials adjacent the same move constantly toward the discharge opening, thus preventing a dense formation adjacent the vertical member.

Apparatus embodying features of my invention is illustrated in the accompanying drawings, forming a part of this application, in which:

FIG. 1 is a vertical sectional view through the apparatus, partly broken away;

FIG. 2 is a sectional view taken generally along the line 2—2 of FIG. 1; and,

Figure 3:
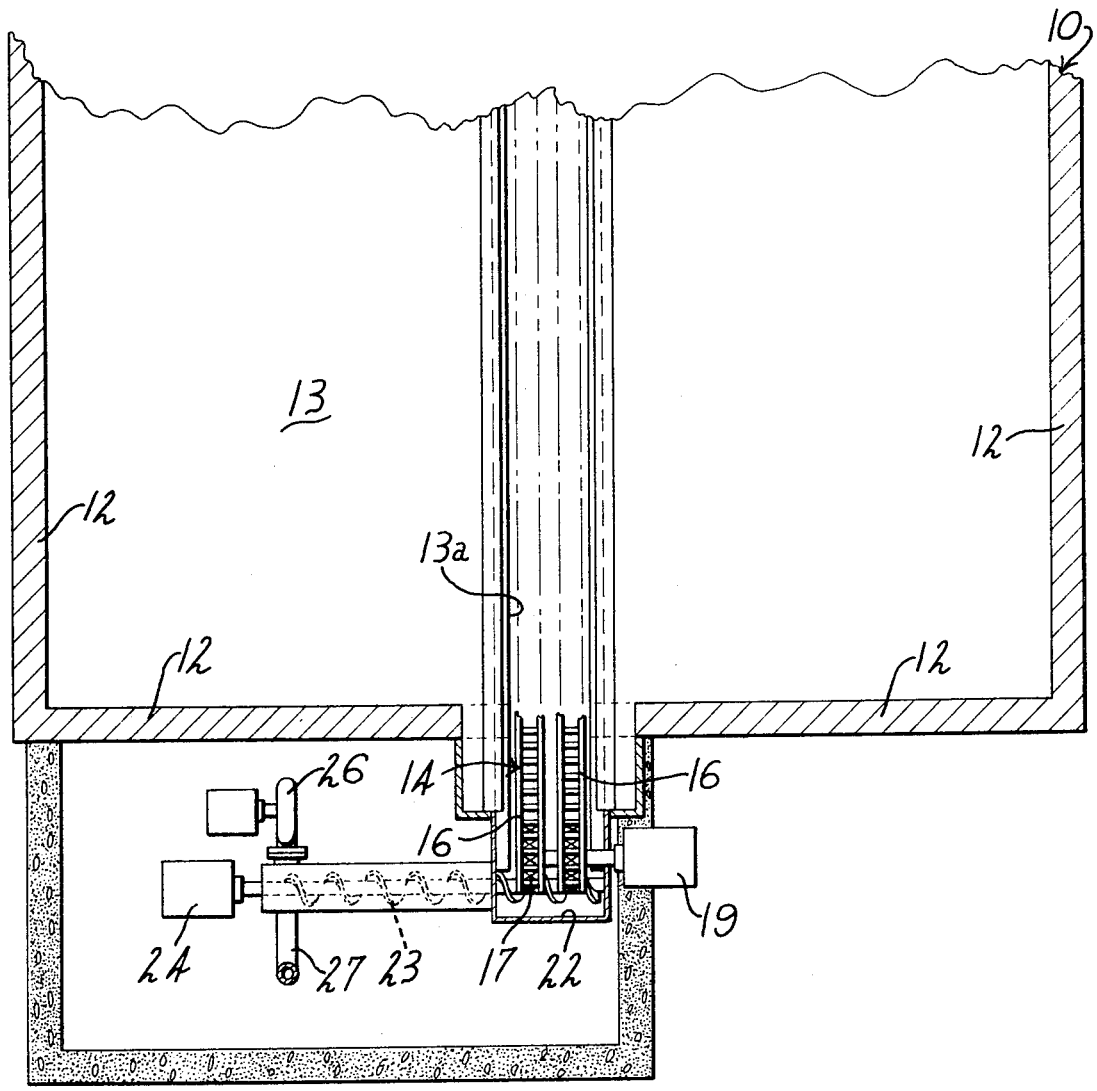
FIG. 3 is a sectional view taken generally along the line 3—3 of FIG. 1.

Referring now to the drawings for a better understanding of my invention, I show a storage bin 10 having a top 11 connected to depending side walls 12. The lower end of the storage bin 10 is provided with a bottom wall 13 having a discharge opening 13a therein which extends all the way across the storage bin, as shown.

Extending beneath the discharge opening 13a is an endless conveyor unit indicated generally at 14, which may be in the form of endless conveyor chains 16 which pass around sprockets 17. The sprockets 17 are mounted on drive shafts 18 which are driven by a power unit 19. Suitable passageways 21 are provided through the depending side walls 12 for passing the conveyor chain 16 whereby the materials are transferred by the conveyor unit to a suitable receptacle 22. The materials may be removed from the receptacle 22 by an auger-type conveyor 23 driven by a motor 24. From the conveyor unit 23 the materials are transferred, by a conventional type blower unit 26, to a discharge conduit 27 in a manner well understood in the art to which my invention relates.

My improved means for eliminating bridging of the materials in the storage bin 10 comprises a vertical shaft-like member 28 which depends through the top 11 of the storage bin 10, as shown in FIG. 1. The upper end of the shaft-like member 28 is secured to a vertical rod 29 which carries a spring abutment 31 adjacent the upper end thereof. Secured to a supporting structure 32 in alignment with the vertical shaft-like member 28 is a vertical cylinder 33 which receives the spring abutment 31 with a sliding fit. Compression springs 34 and 36 are provided at the upper and lower sides of the spring abutment 31, respectively, whereby the spring abutment is urged to a position intermediate the ends of the cylinder 33. As shown in FIG. 1, a suitable opening 37 is provided through the top 11 for receiving the shaft-like member 28 whereby the lower end thereof is adapted for free lateral movement. The lower end of the shaft-like member 28 terminates adjacent and above the discharge opening 13a and the conveyor unit 14, as shown.

Mounted on the vertical shaft-like member 28 are vertically spaced sets of agitator blades indicated generally at 38, 39 and 41. Each set of agitator blades comprises angularly spaced, generally flat blades 42 which extend radially from the shaft-like member 28 in position to penetrate the bulky materials surrounding the member 28 and move relative to the materials. Each agitator blade 42 extends in a vertical plane, as shown. One edge of each blade 42 is secured rigidly to the vertical shaft-like member 28 while the opposite edge thereof extends upwardly and inwardly toward the shaft-like member, as shown. The lower edge of each blade 42 extends in a horizontal plane whereby upon movement of the blade 42, the material is moved downwardly toward the discharge opening 13a and the conveyor unit 14.

Mounted on the shaft-like member 28 intermediate the sets of blades 38 and 39 is a vibrator 43 such as a conventional type electrically operated vibrator which imparts vibration to the shaft-like member 28 and the agitator blades 42 carried thereby. As shown in FIGS. 1 and 2, the member 28 is hollow to provide a passageway for receiving an electrical conduit 40, which supplies current to vibrator 43.

From the foregoing description, the operation of my improved apparatus will be readily understood. Upon introducing the bulky materials into the storage bin 10, the materials flow downwardly around the depending shaft-like member 28. Upon energizing the vibrator 43, the agitator blades 42 are vibrated whereby they move in a generally vertical direction to cause the materials to flow constantly around the outer surface of the shaft-like member 28 whereby there is no dense formation of the materials adjacent the shaft-like member and the agitator blades. That is, a continuous loose condition is maintained between the bulky materials and the shaft-like member 28 whereby there is free flow of materials onto the conveyor unit 14. Accordingly, my improved apparatus prevents the bridging condition from forming whereby there are no cavities in the lower portion of the storage bin as the materials are removed by the conveyor unit 14. The resilient springs 34 and 36 cause the shaft-like member 28 to vibrate freely in a vertical direction and at the same time the lower end of the shaft-like member is adapted for free lateral movement, thus further assuring free flow of the bulky materials relative to the shaft-like member.

From the foregoing, it will be seen that I have devised improved apparatus for storing and feeding bulky materials. By continuously preventing the formation of a bridging condition, I eliminate the formation of cavities within the storage bin at all times, thus eliminating the necessity of probes and other means for dislodging dense materials being handled in the storage bin. By providing angularly spaced agitator blades which extend in vertical planes with the lower edges of the blades extending generally in a horizontal direction, the materials are constantly moved downwardly in a uniform manner to maintain a loose condition around the shaft-like member at all times.

While I have shown my invention in but one form, it will be obvious to those skilled in the art that it is not so limited, but is susceptible of various other changes and modifications without departing from the spirit thereof.

What I claim is:

1. In apparatus for storing and feeding bulky materials,
   a. a storage bin for said materials having a top, depending sides and a discharge opening in the bottom thereof,
   b. a conveyor beneath said discharge opening in position to remove materials discharged through said opening,
   c. a vertical shaft-like member depending from the top of said storage bin with the lower end of said shaft-like member terminating adjacent and above said conveyor and adapted for free lateral movement,
   d. a transversely extending spring abutment operatively connected to the upper end of said vertical shaft-like member,
   e. a vertical cylindrical member supported adjacent the top of said storage bin and receiving said spring abutment with a sliding fit,
   f. spring members within said cylindrical member at opposite sides of said spring abutment urging said spring abutment toward a predetermined position intermediate the ends of said cylindrical member,
   g. angularly spaced, generally flat, agitator blades carried by said vertical shaft-like member, and extending radially therefrom in position to penetrate bulky materials surrounding said shaft-like member and move relative thereto, and
   h. a vibrator mounted on said vertical shaft-like member inwardly of said storage bin and disposed to impart vibration to said shaft-like member and said agitator blades carried thereby.

2. Apparatus for storing and feeding bulky materials as defined in claim 1 in which vertically spaced sets of said angularly spaced agitator blades are mounted on said vertical shaft-like member with said vibrator mounted between sets of blades.

3. Apparatus for storing and feeding bulky materials as defined in claim 1 in which each of said agitator blades extends in a vertical plane with the lower edge thereof extending in a horizontal plane.

4. Apparatus for storing and feeding bulky materials as defined in claim 3 in which the edge at one side of each said agitator blade is secured to said shaft-like member with the edge at the other side of said agitator blade extending upwardly and inwardly toward said shaft-like member.

* * * * *